INVENTOR
GEORG MESNER
BY
ATTORNEYS

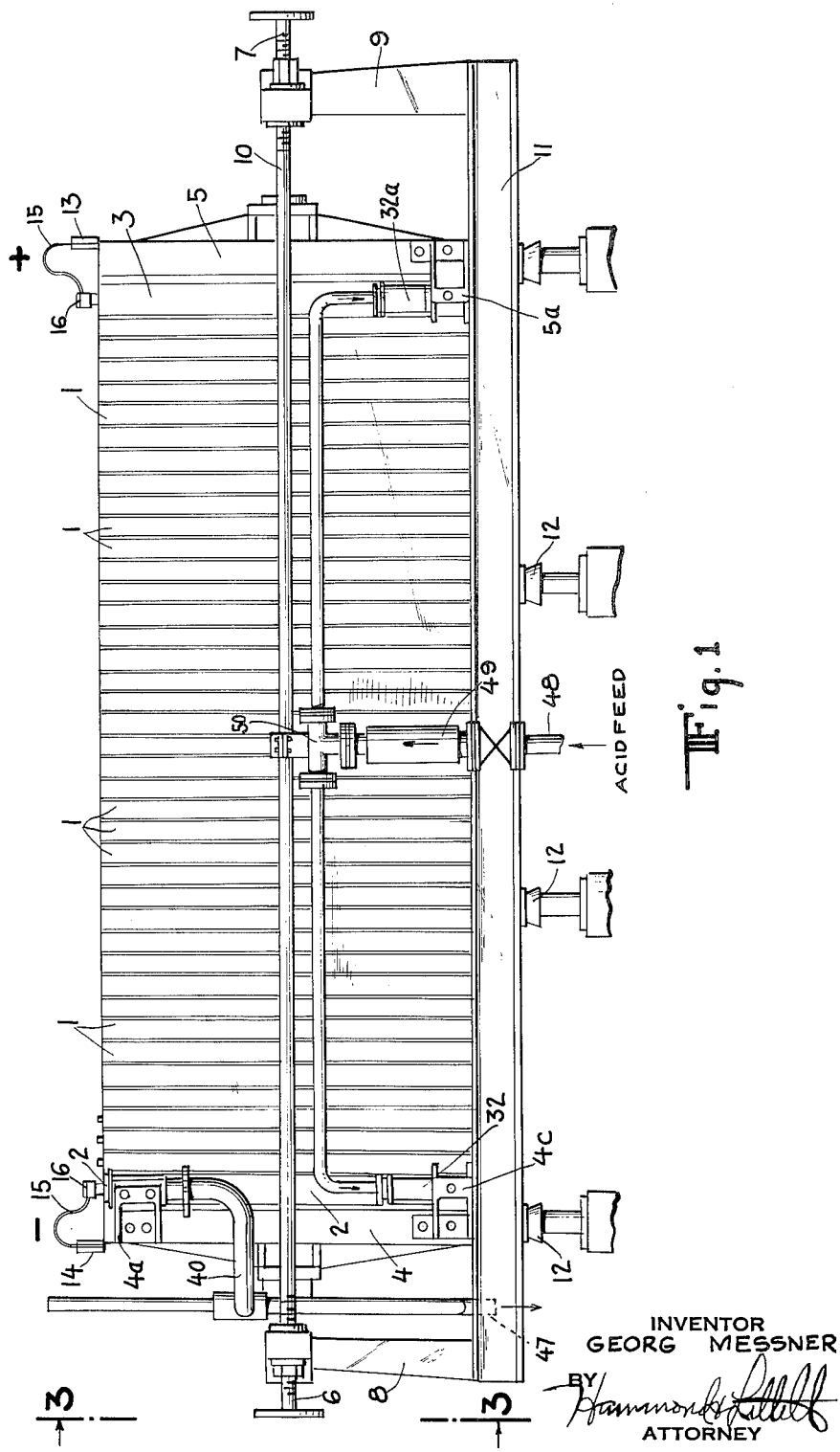

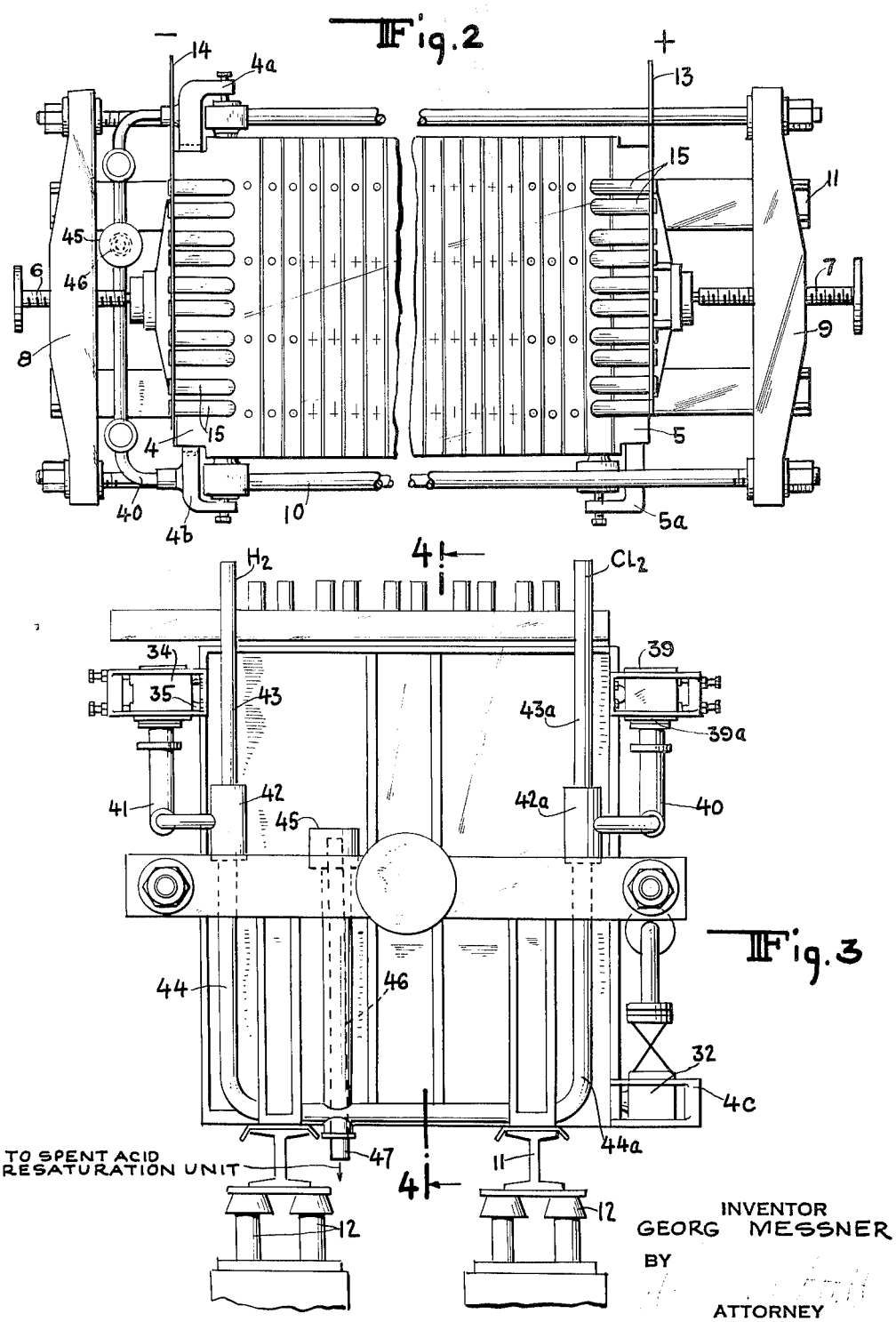

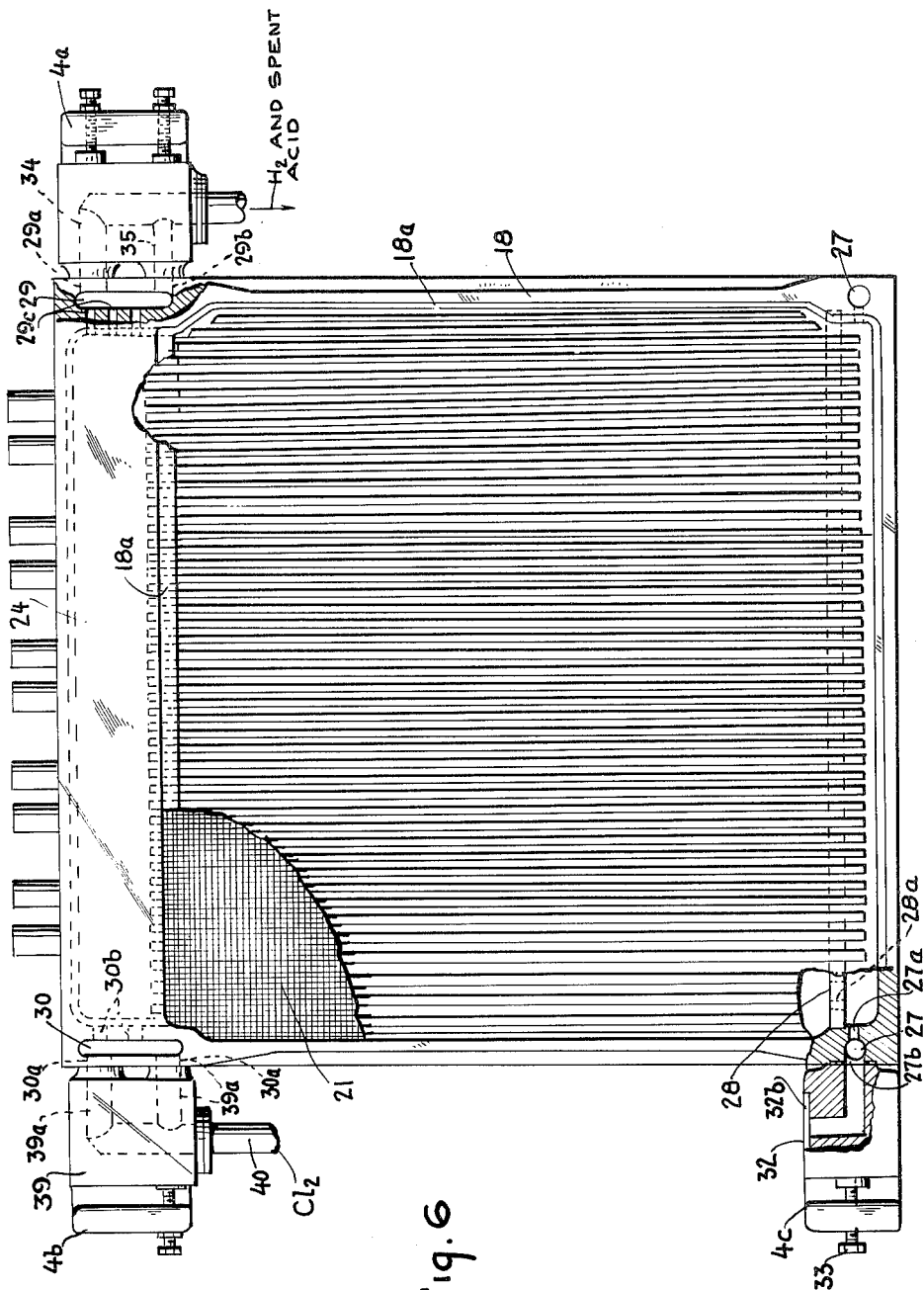

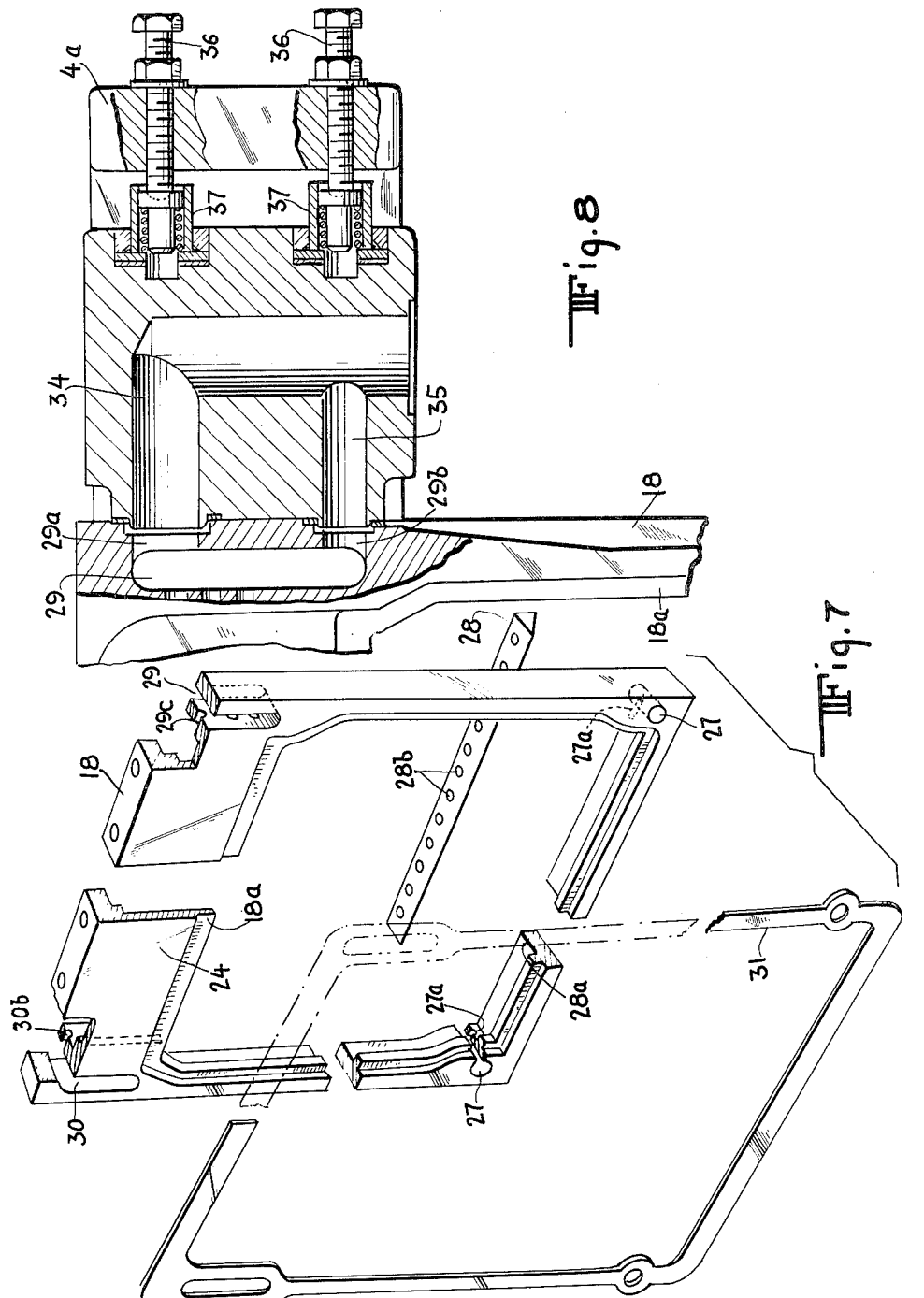

United States Patent Office 3,236,760
Patented Feb. 22, 1966

3,236,760
CELLS FOR THE PRODUCTION OF CHLORINE
FROM HYDROCHLORIC ACID
Georg Messner, Milan, Italy, assignor to Oronzio de Nora Impianti Elettrochimici, Milan, Italy, a corporation of Italy
Filed Nov. 9, 1959, Ser. No. 851,863
2 Claims. (Cl. 204—256)

This invention relates to improvements in electrolytic cells for the electrolysis of hydrochloric acid, such as described in Fiat Report No. 832, issued by the Office of Military Government for Germany (U.S.) on June 19, 1946.

While the cell described in said publication can be made to work over limited periods of time for the production of $Cl_2$ and $H_2$ from hydrochloric acid, its operation has never been satisfactory and is accompanied with many operating difficulties, such as ununiform electrolyte feed to the cell units, ununiform concentration of electrolyte in the cell units, ununiform pressure in the gas chambers at the top of each cell unit, ununiform drainage of spent electrolyte, leakage of chlorine and hydrogen through the diaphragm at the top of the cell units with consequent danger of explosion, and other disadvantages.

It is the object of the present invention to improve the operation and construction of cells of this type so as to overcome many of the defects and disadvantages thereof and permit their safe utilization on an industrial scale over long periods of time.

More specifically one of the objects of my invention is to provide a cell of the type described for the recovery of chlorine and hydrogen from hydrochloric acid in which there is a permanent rigid seal or barrier against leakage of chlorine and hydrogen between the chlorine and hydrogen collecting chambers provided by the frame members at the top of each cell unit whereby danger of intermingling of these gases and consequent explosion due to cell deterioration is permanently prevented.

An important object of this invention is to provide improved means to feed hydrochloric acid to be electrolyzed into the cell whereby acid of uniform concentration is maintained in each cell unit and the acid level is maintained at a uniform height in all cell units.

Another object of this invention is to provide improved outlets for the chlorine, hydrogen and spent acid whereby the operation of these outlets is improved and manufacture of the outlet connections is simplified, breakage is reduced and a more complete separation of the chlorine and hydrogen from the spent acid is attained.

Another object of this invention is to provide improved means for clamping the chlorine, hydrogen and spent acid outlets and the concentrated acid inlets to the cell whereby assembly and disassembly of the cell is facilitated.

Another object of the invention is to provide improved means for clamping the cell units together in fluid tight engagement and for limited movement of the clamping means without disturbing the electrical connections between the terminal anode and the cathode plates and the positive and negative bus bars.

Another object of the invention is to provide an improved manifold system for gathering the spent acid from a hydrochloric acid electrolysis cell, whereby mixing of $Cl_2$ or $H_2$ discharged with the spent acid is prevented.

Various other objects and advantages of my invention will appear as this description proceeds.

Referring now to the drawings which illustrate a preferred embodiment of the invention, FIG. 1 is a side view of the assembled cell.

FIG. 2 is a top plan view of the assembled cell with parts omitted.

FIG. 3 is an end view of the left end of FIG. 2.

FIG. 6 is a face view of one of the cell elements looking toward the left end of FIG. 2 with the various inlet and outlet connections shown partially in section.

FIG. 7 is an exploded perspective view of a gasket and one of the element frames, and FIG. 8 is a detailed view of a hydrogen and spent acid connection clamping means.

Figure 4:
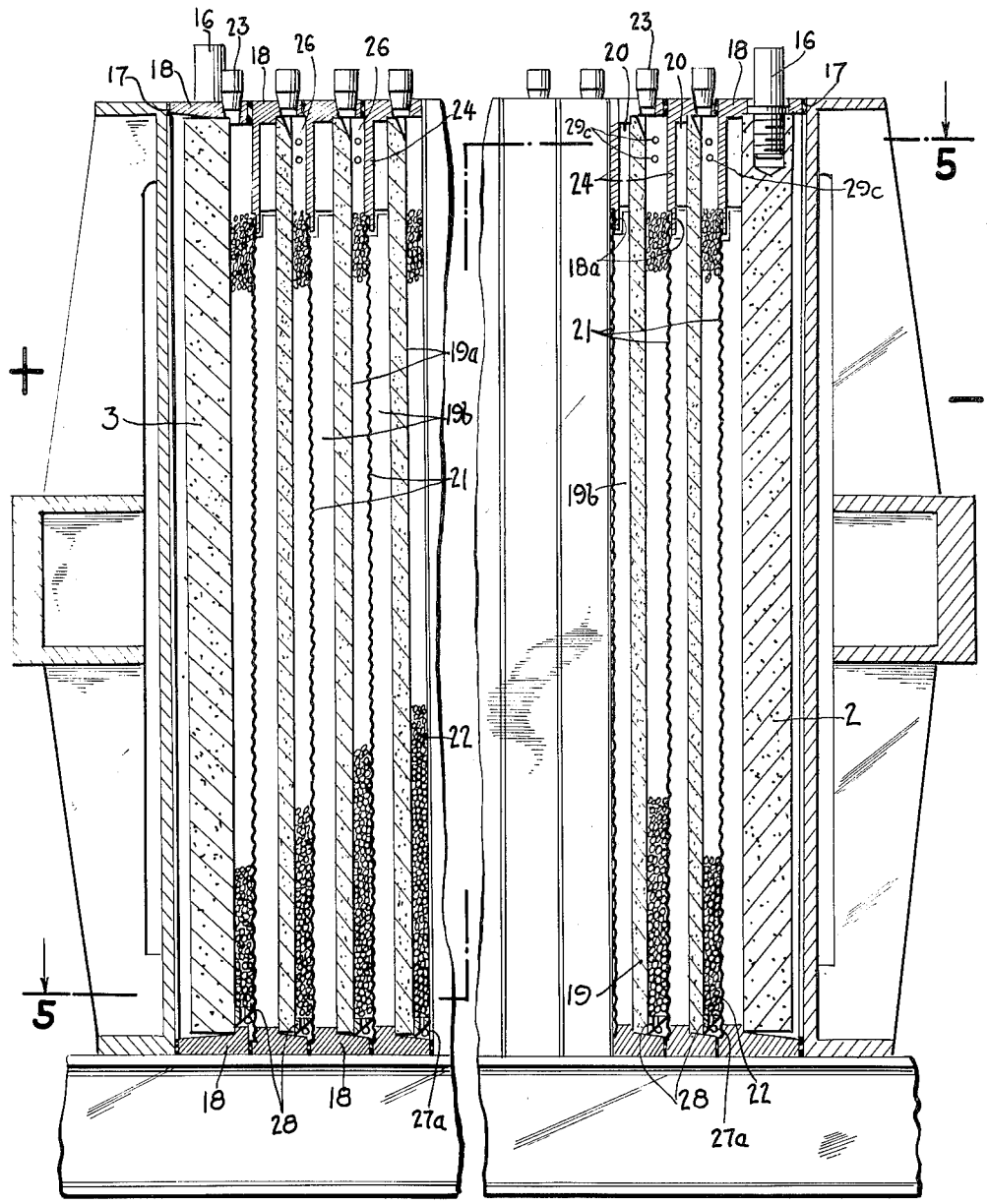
FIG. 4 is a part sectional view taken approximately on the line 4—4 of FIG. 3 looking in the direction of the arrow.

As illustrated in FIGS. 1, 2 and 3 the cell consists of a plurality of bi-polar intermediate units 1 of substantially identical construction, a cathodic end section 2 and an anodic end section 3 clamped together in a filter leaf arrangement between end plates 4 and 5 controlled by cap screws 6 and 7 operating in yokes 8 and 9 connected together by tie rods 10. The cell illustrated consists of 40 cell units, although a smaller or larger number of cell units may be used.

The cell rests on rubber or insulation covered I-beams 11 supported on porcelain insulator 12. By manipulation of the cap screws 6 and 7 the entire filter leaf construction can be quickly assembled and made fluid tight and likewise quickly separated for disassembly. In assembling, the long cap screw 7 is used first for compression of the elements, while cap screw 6 is drawn back as much as possible. Cap screw 6 is then advanced after 7 has already compressed the cell.

The connections to the positive and negative bus bars 13 and 14 are made with flexible or elastic U-shaped copper connectors 15 attached to the bus bars at one end and to graphite rods 16 screwed into the cathode and anode end plates 2 and 3. An elastic connection between the bus bars 13 and 14 and the graphite rods 16 is important because the position of the end electrodes relative to the steel end plates 4 and 5 of the pressing frame depends upon the pressure exerted by the capstan screws 6 and 7 as there is an elastic rubber cushion 17 (FIG. 4) between each end electrode 2 and 3 and its steel end plate 4 or 5. This elastic connection can, however, take other forms than the U-shaped copper connectors 15. Capstan screws 6 and 7 are provided at each end of the cell as this avoids the use of excessive pressure at one end to make the whole cell fluid tight.

Figure 5:
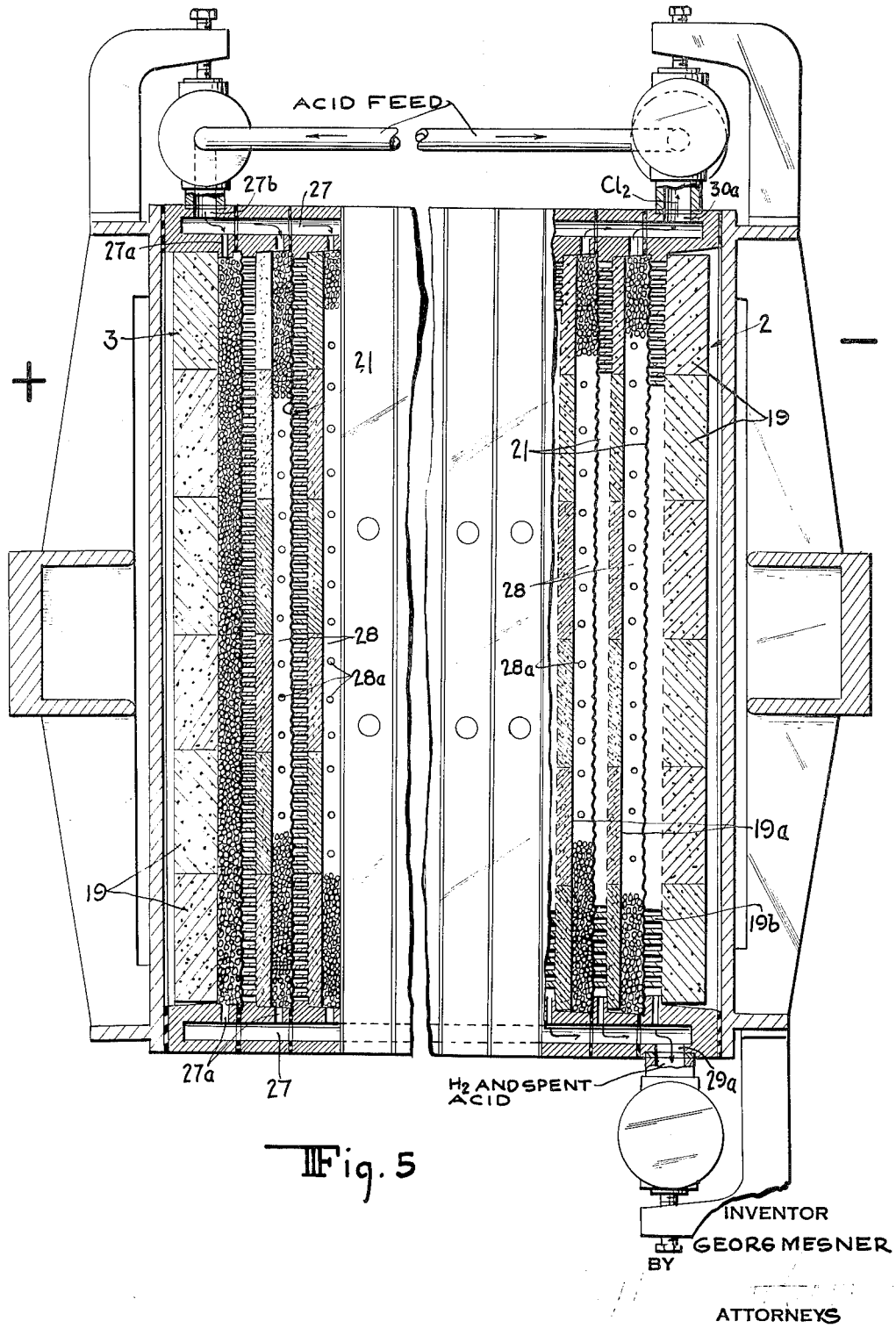
FIG. 5 is a part sectional view on the line 5—5 of FIG. 4, the left side being a section along the bottom of FIG. 4 and the right side being a section along the top of FIG. 4.

The end sections 2 and 3 are made of graphite and are each provided with a plurality of graphite connectors 16 screwed into the top thereof for the electrical connections with the bus bars 13 and 14 as just described. The end sections 2 and 3 and each of the intermediate cell units are mounted in an outer substantially rigid frame 18 made of insulating material resistant to chlorine and hydrochloric acid, such as Haveg, impregnated graphite, rubber covered steel, porcelain or the like. The graphite slabs 19 forming the cathodic end section 2 are grooved on their inner face as indicated in FIG. 5 and the graphite slabs 19 forming the anodic end section 3 are smooth on their inner face for reasons which will become apparent hereinafter.

Each of the intermediate cell units consists of the outer frame 18 into which graphite slabs 19 are cemented to provide a smooth face 19a on the anodic side and a grooved face 19b on the cathodic side, with the grooves running substantially vertically from the bottom to the top of the face 19b all the way across the cell, to conduct hydrogen gas released on the cathodic face to the hydrogen gas chamber 20 at the top of each cell unit. An acid resistant diaphragm 21 is cemented into the rabbeted edge 18a (FIG. 6) on the cathodic side of each frame 18 and in the assembled cell, the free space between the diaphragm 21 and the opposite smooth anodic face 19a of the next plate is filled with broken graphite particles 22, to a level a little higher than the electrolyte level, through stoppers 23 provided for that purpose in the frames 18. The space above the broken graphite particles forms a chlorine gas chamber 26. The stoppers 23 may be formed as tapered polyvinyl chloride plugs and may be secured in place with polyvinyl chloride cement. The diaphragms 21 may be formed of woven polyvinyl chloride cloth, as described in said FIAT report or of any other suitable diaphragm material.

Each of the frames 18 has a gas chamber separator 24 of the same material preferably formed integral therewith, although the gas chamber separators 24 may be a separate piece of rigid gas impervious material cemented into the top portion of the frame 18. The gas chamber separators 24 extend downward from the top of the frame members 18 below the electrolyte level of the cell and dip into the electrolyte so as to form a permanent gas tight separator between the respective chambers 20 and 26 for the hydrogen and chlorine gas in each of the cell units and the bottom edge of each separator 24 is provided with a rabbet 18a (FIGS. 4 and 6) to receive the upper edge of each diaphragm therein. The grooves 19b terminate below the electrolyte level so as to form a free gas chamber 20 for the hydrogen gas above the grooves 19b and above the electrolyte level, and the broken graphite filling 22 normally extends above the level of the electrolyte in the frames 18 to form a chlorine gas space at the top of each frame member and to provide a little additional broken graphite reservoir which gradually settles during operation and which requires refilling every three or four months. The diaphragms 21 are cemented into the rabbeted edges 18 of the cathodic face of each frame 18 and to the similar rabbet along the lower face of the separtors 24 so as to prevent hydrogen penetrating between the anodic and the cathodic compartments. By thus providing rigid gas impervious separators 24 instead of diaphragms between the hydrogen and chlorine gas chambers, all possibility of these gases penetrating through the separators, causing loss of part of the product as also danger of explosion is avoided.

As illustrated in FIGS. 6 and 7 each of the intermediate frame members 18 is provided near the lower corners thereof with openings 27 for the passage of electrolyte through the frame members from one end of the assembled cell to the others and with passages 27a from the openings 27 into the interior of the frames 18. A perforated triangular bar 28 rests upon a ledge 28a in the bottom of the frame members 18 to form a passage for the electrolyte from one opening 27 to the opposite opening 27 and to uniformly distribute the electrolyte through the perforations 28b into each anode compartment where it rises through the broken graphite pieces resting on the bars 28, passes through the diaphragms 21, and overflows as spent acid from the top of each cell unit. Near the upper corners the frames 18 are provided with oblong openings 29 and 30 connected by passages 29c and 30b with the interior of the frames 18 and which when the frames are assembled provide channels for the passage of chlorine and hydrogen gas as well as spent electrolyte from end to end of the assembled cell and out of the cell. Gaskets 31 provided with openings matching the openings in the frames 18 are provided for insertion between each of the frame members 18.

The end members 2 and 3 are provided with passages 27b (FIGS. 5 and 6) at each end of the cell for conducting fresh electrolyte into the openings 27 and the end member 2 is provided with passages 29a and 29b communicating with openings 29 for conducting hydrogen and spent electrolyte respectively out of the cell and passages 30a for conducting chlorine out of the cell.

Special inlet and outlet couplings are provided for the passages into and out of the anode and cathode end sections 2 and 3. Each of the steel end plates 4 and 5 are provided with L-shaped clamping arms 4a, 4b, 4c and 5a (FIGS. 2 and 3) secured thereto for removably clamping the acid inlet and outlet and chlorine and hydrogen outlet connections to the end sections 2 and 3. As indicated in FIGS. 1, 2 and 3 acid inlet connections 32 and 32a are provided at the bottom of each end of the cell. These consist of a Haveg or equivalent couplings 32b (FIG. 6) held in fluid tight connection with the passages 27b into the openings 27 by an adjustable screw bolt 33 threaded into the clamping arm 4c on the end plates 4 and 5 and providing a spring pressure against the couplings 32b, suitable gaskets (not shown) being provided to render the connection between the couplings 32b and the anode and cathode end frames fluid tight.

The inlet and outlet connection are illustrated in greater detail in the connector for hydrogen and spent acid is shown in FIGS. 6 and 8. This consists of hydrogen outlet connector 34 and spent acid connector 35 in the same block held in fluid tight engagement with the passages 29a and 29b by screw bolts 36 carried in clamping arm 4a and bearing against coil springs 37 which provide a flexible seating of the connector block 34 and 35 against gaskets inserted between the ends of the connectors and the frame 18 of end section 2. The opening 29b (FIG. 8) is at the lowest part of the oblong opening 29 so that the channel formed by openings 29 is completely drained of spent acid which permits more of this channel being used for H₂ gas and prevents pressure increase on the H₂ gas by partial blockage of the outlet channel by spent acid.

In a similar manner connector 39 (FIG. 6) leading to the chlorine outlet pipe 40 is connected to the passages 30a leading from the chlorine channel 30. The lower passage conducts any spent acid which escapes into the chlorine channel 30 out of this passage with the chlorine flowing through the passages 39a in the connector 30. Spent acid trapped in the chlorine outlet might cause foaming and block or partially block the chlorine outflow which would lead to irregularities in the operation of the cell. While the chlorine outlets 30b from the chlorine gas chambers 26 in the top of the individual cell units, to the passages formed by the openings 30 are located above the level of the bottom spent acid outflow channel 29c, nevertheless some acid becomes entrapped in the outflowing chlorine gas and the use of the lower passage 39a as a spent acid eliminator in the chlorine line is highly desirable.

As both the spent acid flowing from the connector 35 and the acid flowing from the passages 39a are approximately of the same composition they may be gathered in the same manifold system if provisions are made to prevent mixing of any H₂ or Cl₂ contained in these respective acids.

As illustrated in FIG. 3 the spent acid flowing from the connector 35 flows through the conduit 41 into a gas separation chamber 42 from which a hydrogen outlet pipe 43 leads to the hydrogen collecting system, likewise the spent acid flowing from the passages 39a flows through the conduit 40 into gas separation chamber 42a from which a chlorine outlet pipe 43a leads to the chlorine collecting system. From the bottom of the gas separation chambers 42 and 42a conduits 44 and 44a for the spent acid lead into the manifold 45 provided with a standpipe 46 therein, the top of which determines the liquid level in the manifold 45 and hence in the conduits 44 and 44a. A conduit 47 conducts the spent acid flowing through the standpipe 46 to the HCl absorption tower for resaturation with HCl. By the use of the spent acid manifold system described, a liquid seal is continuously maintained between any hydrogen in the spent acid outflow and any chlorine in the acid from the acid eliminator and all danger from intermingling of these gases is overcome.

The concentrated acid feed system consists of the acid feed line 48 (FIG. 1), fed with preferably about 33% HCl, from a pump or head tank capable of maintaining the desired acid flow to the cell. From the line 48 the acid flows through a rotameter 49 to a T connection 50 where one line goes to the acid inlet connection 32 and the other to the acid inlet connection 32a at opposite ends of the cell. From the acid inlet connections 32 and 32a the concentrated acid flows through the passages formed by opening 27 (FIG. 5) from end to end of the cell, through the passages 27a into the bottom of each cell unit and across each cell unit in the channel formed beneath the bars 28 to the passage formed by openings 27 on the opposite side of the cell, thereby forming a closed ring system for acid feeding which assures even and regular distribution in nearly perfect equal parts to each cell unit, and which provides about the same liquid pressure on all cell units. The equal feeding of all cell units is important because the HCl concentration in the single elements depends upon the acid feed and from the HCl concentration depends—

(a) The energy consumption. As the element voltage depends upon the HCl concentration in the form of a curve with a maximum (at about 18% HCl), a lower HCl concentration in some elements cannot be compensated by a correspondingly higher HCl concentration in other elements.

(b) The anodic graphite consumption.

From the passages 28b in the bars 28 the concentrated acid rises through the broken graphite particles 22, passes through the diphragms 21 and is discharged as spent acid through the spent acid outlet 29b, the level of the acid in the cell units being determined by the lowest hole 29c through the frames 18 into the passage formed by openings 29.

The operation of the cell will be apparent from the above description. The concentrated electrolyte is fed from the passages formed by openings 27 to the anodic compartment of each cell as described above, passes through the diaphragm into the cathodic compartment and rises to the upper level determined by the spent electrolyte discharge holes in each cell unit frame 18. Chlorine is released on the broken graphite particles and rises to the chlorine chamber 26 at the top of each cell unit and is discharged into the openings 30 and passes out of the cell through the chlorine outlet 39. Hydrogen is released on the grooved faces of the graphite plates and rises to the top of each cell unit into the hydrogen chambers 20 and is discharged into the openings 29 of each cell unit and passes out of the cell through hydrogen outlet 34. Spent acid flows through the lower passage 29c into the openings 29 of each cell unit and passes out of the cell through the spent acid outlet passage 35. Some spent acid also flows from the lower passage 39a in the chlorine outlet connector 39.

*Example*

Hydrochloric acid of approximately 33% HCl concentration was fed to a 40 unit cell at a rate that the outflowing depleted acid was approximately 18% HCl. The temperature of the inflowing acid was approximately 25° C. and the temperature of the outflowing acid was approximately 80° C. The cell operated at 80° C. to 90° C. A D.C. current of 1500 amperes was passed through the cell, the individual cell unit voltage was 2.3 v. and the voltage across the entire cell was 92 v. giving a power consumption of 1750 kw. h./2000 lbs. of chlorine. The current density was 0.6 A. sq. in. Some consumption of the broken graphite particles takes place due to the slight amount of oxygen discharged with the chlorine. This consumption is replaced from the reservoir of broken graphite in the top of the chlorine chambers 26 and by filling additional graphite into the cell compartments every three or four months as required. The graphite plates, however, remain unaffected for many years. Chlorine was discharged from the chlorine outlet at the rate of 1.8 tons per day and hydrogen at the rate of 18,300 cu. ft. per day.

The chlorine gas (dry basis) analyzed:

$CO_2$ ---------------------- 0.05% by vol.
$H_2$ ----------------------- Less than 0.1% by vol.
$O_2$ ----------------------- Less than 0.01% by vol.
$Cl_2$ ---------------------- 99.9+%.

The hydrogen gas (dry basis):

$Cl_2$ ---------------------- Less than 0.1% by vol.
$H_2$ ----------------------- 99.9+%.

While I have described a specific embodiment of my improved cell and given an illustrative example of its use it is to be understood that this is for the purpose of illustration only and that various other embodiments and applications of my invention may be made within the scope of the following claims.

I claim:

1. In a bipolar electrolytic cell for the production of chlorine and hydrogen from hydrochloric acid, a filter press construction consisting of a plurality of intermediate cell units, a cathodic end section, an anodic end section and means to press said end sections and intermediate cell units together in fluid tight contact, means to impress an electric current across the cell, each intermediate cell unit comprising a substantially rectangular open frame, a bipolar graphite plate electrode fitted in said frame and acting as a cathode on one side thereof and as an anode on the other side thereof, said graphite plate having vertical grooves on the side forming the cathode face, a rigid impervious vertical divider partition on the side forming the cathode face of said frame and integral therewith and having a substantially rectangular shape, said divider partition extending downward a substantially minor part of the vertical dimension of said frame, whereby a space is formed between said partition and the side forming the cathodic face of said graphite plate enclosed except at the bottom of the space, a diaphragm fitted to the lower transverse edge of said rigid divider partition and extending over the entire face of said rectangular open frame, wherein the space between the side forming the cathodic face of said graphite plate and said diaphragm defines a cathode chamber and the space between the side forming the anode face of said graphite plate and the next adjacent diaphragm defines an anode chamber, a broken graphite filling in said anode chamber, passages extending in the longitudinal direction of the cell in the upper and lower corners of said frame, openings from each anodic chamber into one of said upper longitudinal passages for the passage of hydrogen and spent acid, transverse passages in one of said end sections connecting with said longitudinal upper passage for the passage of hydrogen and spent acid from said cell, openings from each cathodic chamber into the opposite upper longitudinal passage for chlorine and spent acid, transverse passages in one of said end sections connecting with said upper longitudinal passage for the passage of chlorine and spent acid from said cell, openings from said lower longitudinal passages into said anode chambers for hydrochloric acid, a manifold connecting with openings in said anodic and cathodic end sections for feeding hydrochloric acid into said cell, outlets connecting with said transverse passages for withdrawal of hydrogen, spent acid and chlorine, conduits connected with said outlets and to a single spent acid discharge conduit having an overflow conduit, said overflow conduit being of such height to provide a liquid seal between said hydrogen and chlorine outlets and to maintain the level of electrolyte in the cell above the lower edge of said divider, said conduits being provided at the respective outlets with a branch coupling to provide for the withdrawal of hydrogen and chlorine, a negative bus bar adjacent the cathodic end section, a positive bus bar adjacent the anodic end section and flexible electrical connections between said bus bars and their respective end sections.

2. The cell of claim 1 wherein the longitudinal passages for chlorine and hydrogen have a greater vertical dimension than horizontal dimension, a plurality of openings from each anode and cathode chamber into said longitudinal passages adjacent the upper part of said passages, and the outlet from each longitudinal passage comprises two separate openings, one adjacent the top and one adjacent the bottom of each longitudinal passage and independent fluid conduit coupling element having openings coinciding with said separate longitudinal passage outlet openings, said coupling element passages leading to a common passage in said coupling element, said common passage being connected to a discharge conduit, and removable spring clamping means to hold said coupling element in position at said longitudinal passage outlet openings.

References Cited by the Examiner

UNITED STATES PATENTS

| | | | |
|---|---|---|---|
| 724,842 | 4/1903 | Garuti et al. | 204—252 |
| 1,176,105 | 3/1916 | Swartley | 204—279 |
| 1,239,012 | 9/1917 | Hybinette | 204—257 |
| 2,282,058 | 5/1942 | Hunter et al. | 204—256 |
| 2,390,591 | 12/1945 | Janes | 204—129 |
| 2,457,234 | 12/1948 | Herbert et al. | 204—195 |
| 2,468,766 | 5/1949 | Low | 204—128 |
| 2,695,874 | 11/1954 | Zdansky | 204—258 |
| 2,719,822 | 10/1955 | Kassel | 204—128 |
| 2,739,936 | 3/1956 | Zdansky | 204—256 |
| 2,786,811 | 3/1957 | Swope | 204—256 |
| 2,858,263 | 10/1958 | Lucas et al. | 204—256 |
| 2,860,100 | 11/1958 | Krzyszkowski | 204—252 |
| 2,862,864 | 12/1958 | Berghaus | 204—256 |

FOREIGN PATENTS

| | | |
|---|---|---|
| 1,011,855 | 7/1957 | Germany. |
| 71,230 | 11/1946 | Norway. |

OTHER REFERENCES

Fiat Final Report No. 832, Office of Military Gov't for Germany (U.S.), June 19, 1946.

JOHN H. MACK, *Primary Examiner.*

JOHN R. SPECK, MURRAY TILLMAN, WINSTON A. DOUGLAS, *Examiners.*